United States Patent
Itakura

(10) Patent No.: US 10,817,864 B2
(45) Date of Patent: Oct. 27, 2020

(54) SALES DATA PROCESSING APPARATUS, TERMINAL APPARATUS AND RECORDING METHOD

(71) Applicant: CASIO COMPUTER CO., LTD., Shibuya-ku, Tokyo (JP)

(72) Inventor: Katsuyuki Itakura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 37 days.

(21) Appl. No.: 15/967,882

(22) Filed: May 1, 2018

(65) Prior Publication Data
US 2018/0315036 A1 Nov. 1, 2018

(30) Foreign Application Priority Data

May 1, 2017 (JP) .................................. 2017-090925
Feb. 22, 2018 (JP) .................................. 2018-029292

(51) Int. Cl.
G06Q 20/20 (2012.01)
G06Q 20/32 (2012.01)
G07G 1/12 (2006.01)
G06Q 20/30 (2012.01)

(52) U.S. Cl.
CPC ......... *G06Q 20/209* (2013.01); *G06Q 20/207* (2013.01); *G06Q 20/30* (2013.01); *G06Q 20/3278* (2013.01); *G07G 1/12* (2013.01)

(58) Field of Classification Search
CPC .... G06Q 20/209; G06Q 20/30; G06Q 20/207; G06Q 20/3278; G06Q 10/0838; G07G 1/12
See application file for complete search history.

(56) References Cited

U.S. PATENT DOCUMENTS

| 4,503,503 A | * | 3/1985 | Suzuki | G06Q 20/203 705/22 |
| 4,893,237 A | * | 1/1990 | Unno | G06Q 20/202 705/21 |
| 4,958,291 A | * | 9/1990 | Mamone | G06F 21/60 235/379 |

(Continued)

FOREIGN PATENT DOCUMENTS

| EP | 1087348 A2 | 3/2001 |
| EP | 2851878 A1 | 3/2015 |

(Continued)

OTHER PUBLICATIONS

Japanese Office Action dated Oct. 15, 2019 (and English translation thereof) issued in counterpart Japanese Application No. 2018-029292.

(Continued)

*Primary Examiner* — Daniel I Walsh
(74) *Attorney, Agent, or Firm* — Holtz, Holtz & Volek PC

(57) ABSTRACT

A sales data processing apparatus includes a sending control section and a printing control section. The sending control section performs control to send, to a predetermined terminal apparatus, sales data obtained by aggregating predetermined transaction data. The printing control section performs control to print, together with the sales data, sending result information indicating whether or not the sales data has been sent.

20 Claims, 11 Drawing Sheets

| | MODE | STEP1 | STEP2 | STEP3 |
|---|---|---|---|---|
| M1 | READ MODE | TURN OFF NARROW AREA COMMUNICATION UNIT AND WIDE AREA COMMUNICATION UNIT(S11) | PERFORM READ PROCESS(S12) | - |
| M2 | REFUND MODE | TURN OFF NARROW AREA COMMUNICATION UNIT AND WIDE AREA COMMUNICATION UNIT(S21) | PERFORM REFUND PROCESS(S22) | - |
| M3 | CALCULATOR MODE | TURN OFF NARROW AREA COMMUNICATION UNIT AND WIDE AREA COMMUNICATION UNIT(S31) | PERFORM CALCULATOR PROCESS(S32) | - |
| M4 | OFF MODE | TURN OFF NARROW AREA COMMUNICATION UNIT AND WIDE AREA COMMUNICATION UNIT(S41) | PERFORM PROCESS OF TURNING OFF SALES DATA PROCESSING APPARATUS (S42) | - |
| M5 | REGISTER MODE | TURN ON WIDE AREA COMMUNICATION UNIT AND TURN OFF NARROW AREA COMMUNICATION UNIT(S51) | PUT SALES DATA PROCESSING APPARATUS IN COMMUNICABLE STATE WITH ORDER ENTRY APPLICATION AND OUTPUT BEACON OF WIDE AREA COMMUNICATION UNIT(S52) | HANDLE REQUEST SENT FROM PORTABLE TERMINAL AND MANUAL REGISTRATION AT THE SAME TIME(S53) |
| M6 | REPORT MODE | TURN ON NARROW AREA COMMUNICATION UNIT AND TURN OFF WIDE AREA COMMUNICATION UNIT(S61) | PUT SALES DATA PROCESSING APPARATUS IN COMMUNICABLE STATE WITH REPORT APPLICATION AND OUTPUT BEACON OF NARROW AREA COMMUNICATION UNIT(S62) | AFTER HANDLING MANUAL REPORTING, SEND SALES DATA TO REPORT APPLICATION INSTALLED IN PORTABLE TERMINAL(S63) |
| M7 | PROGRAM MODE | TURN ON NARROW AREA COMMUNICATION UNIT AND TURN OFF WIDE AREA COMMUNICATION UNIT(S71) | PUT SALES DATA PROCESSING APPARATUS IN COMMUNICABLE STATE WITH PROGRAM APPLICATION AND OUTPUT BEACON OF NARROW AREA COMMUNICATION UNIT(S72) | HANDLE EITHER REQUEST SENT FROM PORTABLE TERMINAL OR MANUAL PROGRAMMING(S73) |

(56) References Cited

U.S. PATENT DOCUMENTS

| | | | | |
|---|---|---|---|---|
| 5,682,481 A | * | 10/1997 | Fuyama | G06Q 20/20 235/378 |
| 5,745,705 A | * | 4/1998 | Iguchi | G06Q 20/20 235/383 |
| 5,802,496 A | * | 9/1998 | Uchiyama | G06Q 20/202 705/21 |
| 6,144,462 A | * | 11/2000 | Kaplan | H04N 1/0097 358/405 |
| 6,343,739 B1 | * | 2/2002 | Lippert | A47F 9/048 235/379 |
| 6,864,990 B1 | | 3/2005 | Nickerson et al. | |
| 7,243,841 B1 | * | 7/2007 | Nelson | G07F 11/002 235/380 |
| 7,349,884 B1 | * | 3/2008 | Odom | G06Q 20/042 705/40 |
| 7,665,029 B2 | * | 2/2010 | Nakajima | G06F 8/38 715/763 |
| 9,824,345 B2 | | 11/2017 | Chihara | |
| 2002/0020743 A1 | | 2/2002 | Sugukawa et al. | |
| 2002/0052797 A1 | * | 5/2002 | Maritzen | G06Q 20/02 705/7.35 |
| 2002/0065727 A1 | * | 5/2002 | Enoki | G06Q 20/202 705/21 |
| 2002/0070976 A1 | * | 6/2002 | Tanner | G09B 19/00 715/810 |
| 2002/0073042 A1 | * | 6/2002 | Maritzen | G06Q 20/382 705/64 |
| 2002/0103707 A1 | * | 8/2002 | Takeuchi | G06Q 20/0457 705/16 |
| 2002/0116217 A1 | * | 8/2002 | Yamakawa | G06Q 10/083 705/330 |
| 2003/0016400 A1 | * | 1/2003 | Maemura | H04N 1/32058 358/498 |
| 2003/0025944 A1 | * | 2/2003 | Burke | G06Q 20/401 358/405 |
| 2003/0030657 A1 | * | 2/2003 | Kenji | G06F 21/608 715/700 |
| 2003/0090701 A1 | * | 5/2003 | Crane | G06K 15/00 358/1.15 |
| 2003/0208560 A1 | * | 11/2003 | Inoue | G06Q 20/20 709/219 |
| 2003/0233279 A1 | * | 12/2003 | Shinzaki | G06Q 20/04 705/21 |
| 2004/0010455 A1 | * | 1/2004 | Iijima | G06Q 10/087 705/26.1 |
| 2004/0010457 A1 | * | 1/2004 | Kakuta | G06Q 20/20 705/33 |
| 2004/0084516 A1 | * | 5/2004 | Ogawa | G07G 1/12 235/145 R |
| 2004/0263898 A1 | * | 12/2004 | Ferlitsch | G06F 3/1207 358/1.15 |
| 2005/0013643 A1 | * | 1/2005 | Fukano | G06K 15/00 400/76 |
| 2005/0151995 A1 | | 7/2005 | Hauser et al. | |
| 2005/0171845 A1 | * | 8/2005 | Halfman | G06Q 20/20 705/14.25 |
| 2008/0221982 A1 | * | 9/2008 | Harkins | G06Q 30/02 705/14.48 |
| 2009/0239459 A1 | * | 9/2009 | Watts | G07F 9/08 453/18 |
| 2009/0255195 A1 | * | 10/2009 | Bridgman | E04H 14/00 52/174 |
| 2011/0004530 A1 | * | 1/2011 | Miyagawa | G07G 5/00 705/24 |
| 2011/0109926 A1 | * | 5/2011 | Asaga | G07G 1/0036 358/1.9 |
| 2011/0145077 A1 | * | 6/2011 | Nochi | G06Q 40/02 705/16 |
| 2012/0290420 A1 | * | 11/2012 | Close | G06Q 20/20 705/17 |
| 2013/0024304 A1 | * | 1/2013 | Doi | G07G 1/0036 705/16 |
| 2015/0254623 A1 | * | 9/2015 | Velez | G06Q 20/202 705/16 |
| 2015/0262157 A1 | | 9/2015 | Chihara | |
| 2015/0294373 A1 | * | 10/2015 | Schuh | G06Q 30/0255 705/14.53 |
| 2018/0005218 A1 | * | 1/2018 | Schneider | G06Q 20/206 |
| 2018/0121143 A1 | * | 5/2018 | Tsuchida | G07G 5/00 |
| 2018/0300121 A1 | * | 10/2018 | Itakura | G06F 8/65 |
| 2018/0315036 A1 | * | 11/2018 | Itakura | G07G 1/12 |
| 2018/0336540 A1 | * | 11/2018 | Itakura | G07G 1/0009 |
| 2018/0357022 A1 | * | 12/2018 | Darcius | G06F 3/1209 |
| 2019/0026771 A1 | * | 1/2019 | Yamada | G06Q 30/0238 |

FOREIGN PATENT DOCUMENTS

| | | | | |
|---|---|---|---|---|
| JP | 58060374 A | * | 4/1983 | G06Q 30/04 |
| JP | S62049560 A | | 3/1987 | |
| JP | S649575 A | | 1/1989 | |
| JP | H06282758 A | | 10/1994 | |
| JP | H11242780 A | | 9/1999 | |
| JP | H11250132 A | | 9/1999 | |
| JP | 2002063652 A | | 2/2002 | |
| JP | 2004185492 A | | 7/2004 | |
| JP | 2008176484 A | | 7/2008 | |
| JP | 2008299500 A | | 12/2008 | |

OTHER PUBLICATIONS

Extended European Search Report (EESR) dated Aug. 28, 2018 issued in counterpart European Application No. 18170222.6.

* cited by examiner

FIG. 7

| | MODE | STEP1 | STEP2 | STEP3 |
|---|---|---|---|---|
| M1 | READ MODE | TURN OFF NARROW AREA COMMUNICATION UNIT AND WIDE AREA COMMUNICATION UNIT (S11) | PERFORM READ PROCESS (S12) | — |
| M2 | REFUND MODE | TURN OFF NARROW AREA COMMUNICATION UNIT AND WIDE AREA COMMUNICATION UNIT (S21) | PERFORM REFUND PROCESS (S22) | — |
| M3 | CALCULATOR MODE | TURN OFF NARROW AREA COMMUNICATION UNIT AND WIDE AREA COMMUNICATION UNIT (S31) | PERFORM CALCULATOR PROCESS (S32) | — |
| M4 | OFF MODE | TURN OFF NARROW AREA COMMUNICATION UNIT AND WIDE AREA COMMUNICATION UNIT (S41) | PERFORM PROCESS OF TURNING OFF SALES DATA PROCESSING APPARATUS (S42) | — |
| M5 | REGISTER MODE | TURN ON WIDE AREA COMMUNICATION UNIT AND TURN OFF NARROW AREA COMMUNICATION UNIT (S51) | PUT SALES DATA PROCESSING APPARATUS IN COMMUNICABLE STATE WITH ORDER ENTRY APPLICATION AND OUTPUT BEACON OF WIDE AREA COMMUNICATION UNIT (S52) | HANDLE REQUEST SENT FROM PORTABLE TERMINAL AND MANUAL REGISTRATION AT THE SAME TIME (S53) |
| M6 | REPORT MODE | TURN ON NARROW AREA COMMUNICATION UNIT AND TURN OFF WIDE AREA COMMUNICATION UNIT (S61) | PUT SALES DATA PROCESSING APPARATUS IN COMMUNICABLE STATE WITH REPORT APPLICATION AND OUTPUT BEACON OF NARROW AREA COMMUNICATION UNIT (S62) | AFTER HANDLING MANUAL REPORTING, SEND SALES DATA TO REPORT APPLICATION INSTALLED IN PORTABLE TERMINAL (S63) |
| M7 | PROGRAM MODE | TURN ON NARROW AREA COMMUNICATION UNIT AND TURN OFF WIDE AREA COMMUNICATION UNIT (S71) | PUT SALES DATA PROCESSING APPARATUS IN COMMUNICABLE STATE WITH PROGRAM APPLICATION AND OUTPUT BEACON OF NARROW AREA COMMUNICATION UNIT (S72) | HANDLE EITHER REQUEST SENT FROM PORTABLE TERMINAL OR MANUAL PROGRAMMING (S73) |

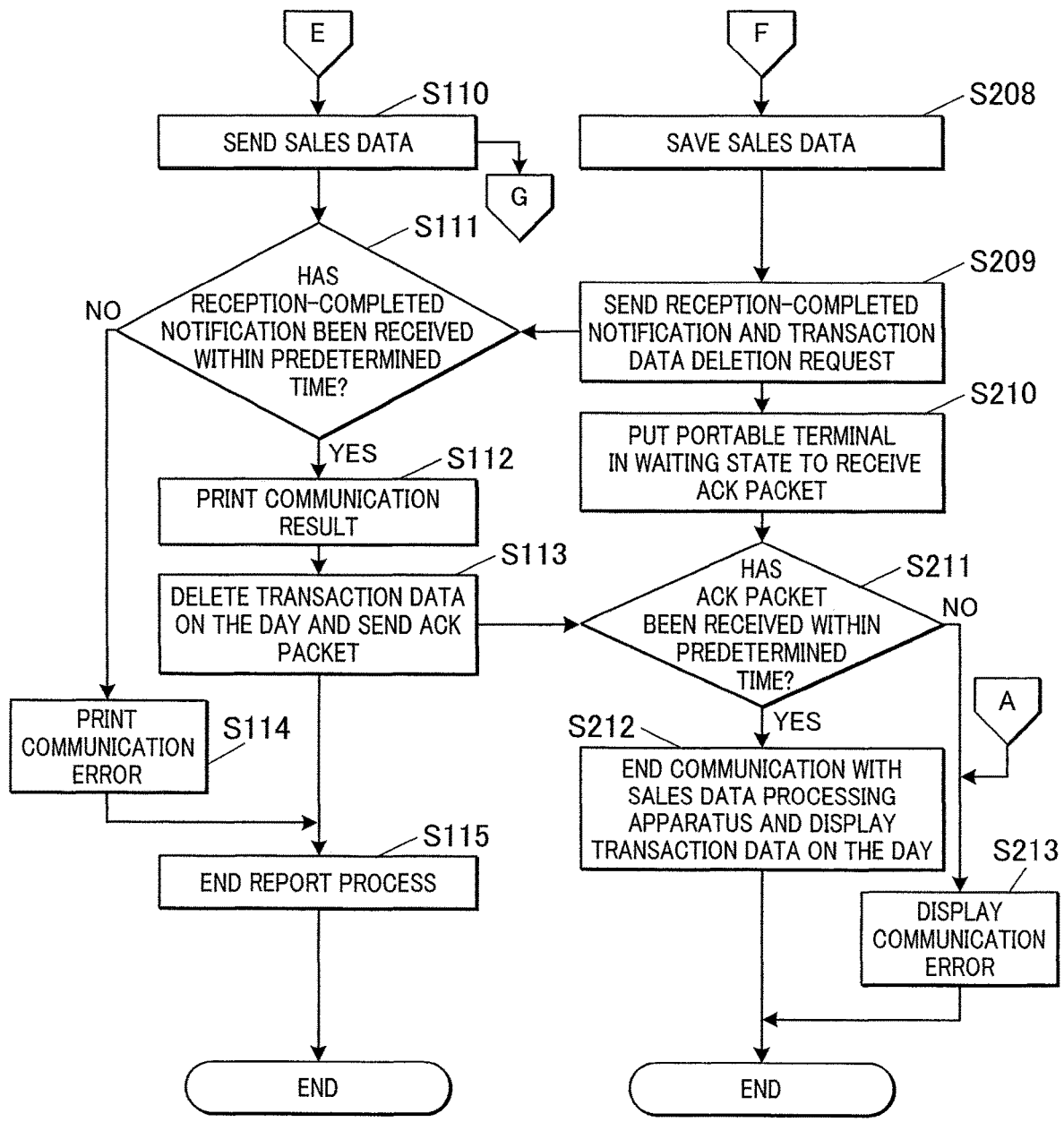

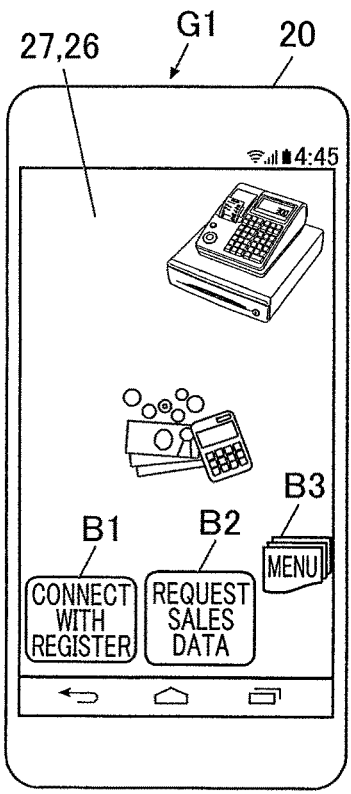
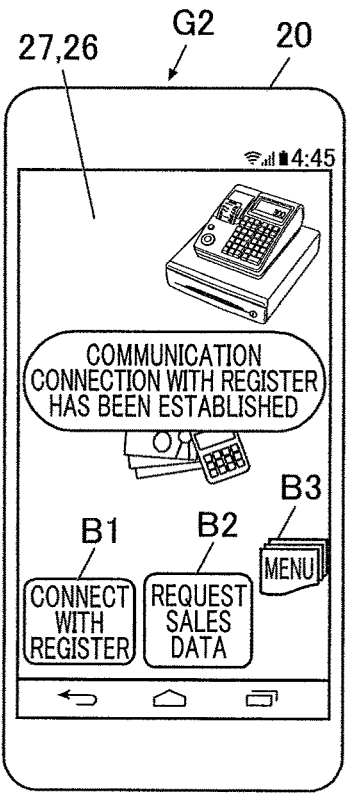
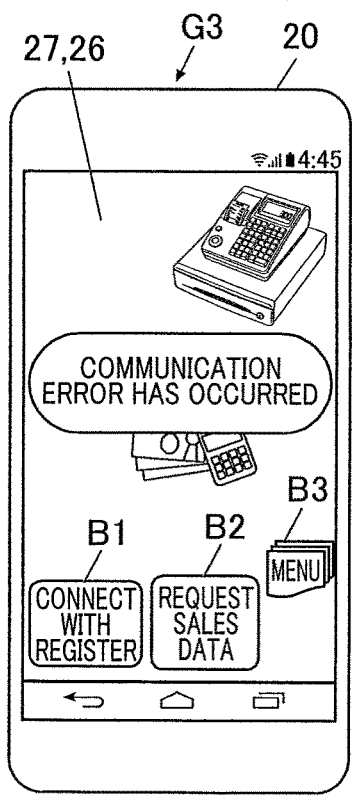
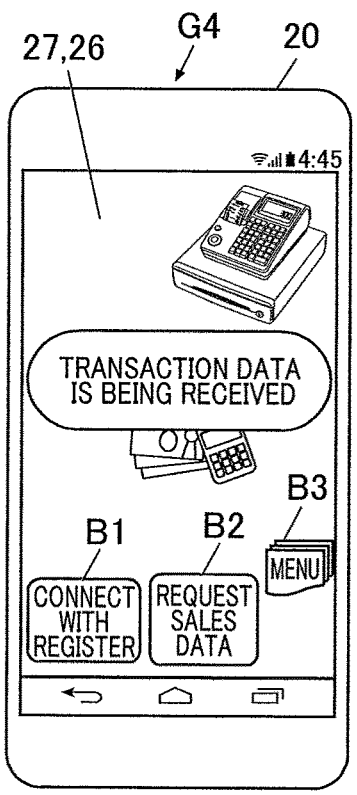
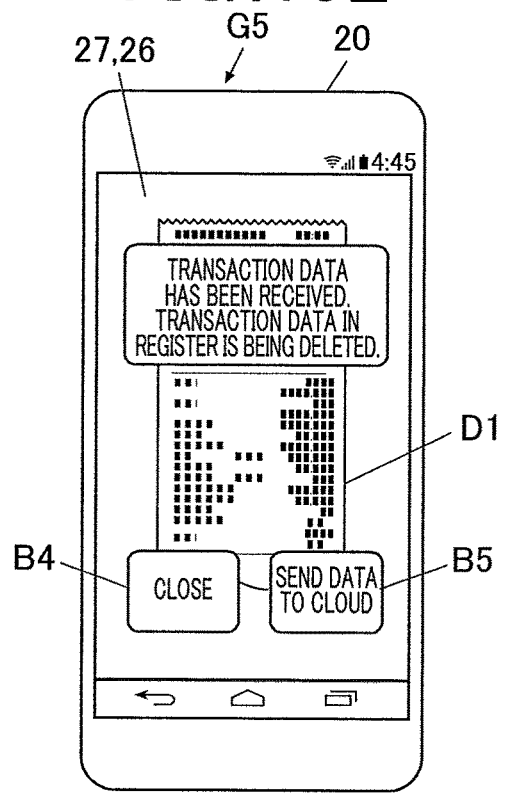

FIG.12A

```
REPORT    2013-07-31 10:53
                          0001-000048
0000 DAILY DETAIL              Z 0002
DEPARTMENT 01           505 ITEM(S)
     44.04%                 ¥231,167
DEPARTMENT 02           411 ITEM(S)
     39.75%                 ¥208,689
DEPARTMENT 03            32 ITEM(S)
     2.72%                   ¥14,297
NON-LINK                 13 ITEM(S)
      1%                     ¥5,283
------------------------------------
GROSS SALES AMOUNT    1060 ITEM(S)
                           ¥524,966
NET SALES AMOUNT       158 COUNT(S)
                           ¥498,747
CASH IN DRAWER AMOUNT      ¥405,361
CHECK IN DRAWER AMOUNT       ¥2,890
CHARGE IN DRAWER AMOUNT     ¥37,405
TOTAL TAXABLE AMOUNT       ¥330,584
TAX AMOUNT      5.0%        ¥15,742
TOTAL NONTAXABLE AMOUNT    ¥153,051
TEN-THOUSAND YEN         17 BILL(S)
SERVICE                       ¥376
CANCELLED TRANSACTION  2 COUNT(S)
                              ¥297
REFUND MODE              1 COUNT(S)
                            ¥6,372
CALCULATOR              18 COUNT(S)
RECEIPT REVENUE STAMP   1 COUNT(S)
                           ¥36,372
RECEIPT                  2 COUNT(S)
                           ¥23,563
------------------------------------
DIFFERENCE                    ¥100

SUCCEEDED IN SENDING
  ・DESTINATION:○△△××○
2017-07-31  10:54
```

```
REPORT    2013-07-31 10:53
                          0001-000048
0000 DAILY DETAIL              Z 0002
DEPARTMENT 01           505 ITEM(S)
     44.04%                 ¥231,167
DEPARTMENT 02           411 ITEM(S)
     39.75%                 ¥208,689
DEPARTMENT 03            32 ITEM(S)
     2.72%                   ¥14,297
NON-LINK                 13 ITEM(S)
      1%                     ¥5,283
------------------------------------
GROSS SALES AMOUNT    1060 ITEM(S)
                           ¥524,966
NET SALES AMOUNT       158 COUNT(S)
                           ¥498,747
CASH IN DRAWER AMOUNT      ¥405,361
CHECK IN DRAWER AMOUNT       ¥2,890
CHARGE IN DRAWER AMOUNT     ¥37,405
TOTAL TAXABLE AMOUNT       ¥330,584
TAX AMOUNT      5.0%        ¥15,742
TOTAL NONTAXABLE AMOUNT    ¥153,051
TEN-THOUSAND YEN         17 BILL(S)
SERVICE                       ¥376
CANCELLED TRANSACTION  2 COUNT(S)
                              ¥297
REFUND MODE              1 COUNT(S)
                            ¥6,372
CALCULATOR              18 COUNT(S)
RECEIPT REVENUE STAMP   1 COUNT(S)
                           ¥36,372
RECEIPT                  2 COUNT(S)
                           ¥23,563
------------------------------------
DIFFERENCE                    ¥100

FAILED TO SEND
  ・DESTINATION:○△△××○
2017-07-31  10:54
```

361

SALES DATA PROCESSING APPARATUS, TERMINAL APPARATUS AND RECORDING METHOD

CROSS-REFERENCE TO RELATED APPLICATIONS

This application is based upon and claims the benefit of priority from the prior Japanese Patent Application No. 2017-090925 filed on May 1, 2017 and the prior Japanese Patent Application No. 2018-029292 filed on Feb. 22, 2018, the entire contents of which are incorporated herein by reference.

BACKGROUND OF THE INVENTION

1. Field of the Invention

The present invention relates to a sales data processing apparatus, a terminal apparatus and a recording method.

2. Description of the Related Art

There is known a conventional sales data processing apparatus, such as an ECR (Electronic Cash Register), which is set in a store where items are sold, and registers therein transaction data including monetary amounts of items and the number of items that have been sold to customers.

There is disclosed, for example, in Japanese Patent Application Publications No. 2002-63652 and No. 2004-185492, a sales data processing apparatus as described above having a communication unit that establishes wireless communication with a terminal apparatus (portable terminal), such as a smartphone, thereby being able to send/receive information to/from the terminal apparatus.

Such a conventional sales data processing apparatus has various modes, such as a program mode to program (set) unit prices of items, a menu and so forth, a register mode to register sales, and a report mode to report (and reset) sales. The conventional sales data processing apparatus is used by an operator (store clerk) or an owner selecting a mode suitable for a purpose.

For example, the conventional sales data processing apparatus performs, in the report mode, a process of printing a sales report obtained by aggregating transaction data on the day.

SUMMARY OF THE INVENTION

According to a first aspect of the present invention, there is provided a sales data processing apparatus including: a sending control section that performs control to send, to a predetermined terminal apparatus, sales data obtained by aggregating predetermined transaction data; and a printing control section that performs control to print, together with the sales data, sending result information indicating whether or not the sales data has been sent.

According to a second aspect of the present invention, there is provided a terminal apparatus including: a first sending control section that performs control to send a sending request for sales data to a sales data processing apparatus; and a second sending control section that performs control to send, to the sales data processing apparatus, a reception-completed notification indicating that reception of the sales data sent from the sales data processing apparatus in response to the sending request has been completed.

According to a third aspect of the present invention, there is provided a recording method including: sending sales data obtained by aggregating predetermined transaction data from a sales data processing apparatus to a predetermined terminal apparatus; sending, from the terminal apparatus to the sales data processing apparatus, a reception-completed notification indicating that reception of the sales data sent from the sales data processing apparatus has been completed; and after the sales data processing apparatus receives the reception-completed notification, or if the sales data processing apparatus does not receive the reception-completed notification within a predetermined time, printing, on a recording sheet with the sales data printed, sending result information indicating whether or not the sales data has been sent.

BRIEF DESCRIPTION OF THE DRAWINGS

The accompanying drawings, which are incorporated in and constitute apart of the specification, illustrate embodiments of the invention, and together with the general description given above and the detailed description of the embodiments given below, serve to explain the principles of the invention, wherein:

FIG. 7 shows action in each mode of the sales data processing apparatus;

FIG. 9 is a flowchart showing the action in the report mode;

FIG. 10A to FIG. 10E show examples of screens displayed on a display unit of the portable terminal in the report mode;

FIG. 12A and FIG. 12B show examples of the sales report with a communication result and a communication error printed, respectively.

DETAILED DESCRIPTION OF THE PREFERRED EMBODIMENTS

Hereinafter, one or more embodiments of the present invention are described in detail with reference to the drawings.

[1. Configuration]
[1-1. Configuration of System]

A configuration of a sales data processing system 1 according to an embodiment(s) is described.

Figure 1:
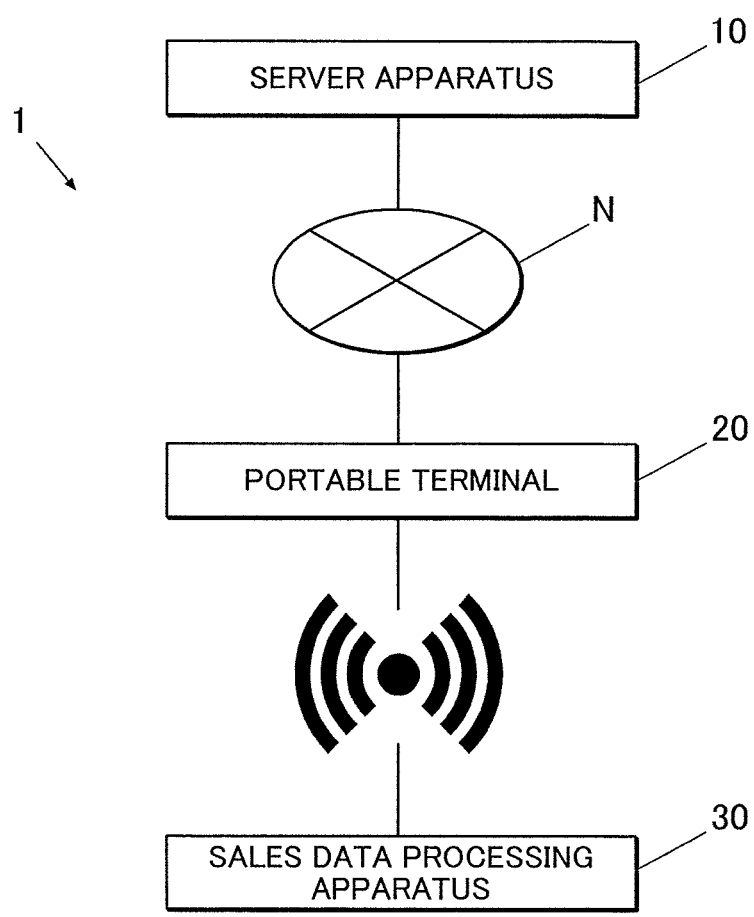
FIG. 1 is a connection diagram showing a schematic configuration of a sales data processing system according to one or more embodiments of the present invention.

As shown in FIG. 1, the sales data processing system 1 includes a server apparatus 10, at least one portable terminal (terminal apparatus) 20 and at least one sales data processing apparatus 30. The server apparatus 10 and the portable terminal 20 are connected to a communication network N.

The communication network N herein is the Internet, but may be another network, such as a LAN (Local Area Network). The portable terminal 20 and the sales data processing apparatus 30 perform narrow area wireless communication, such as Bluetooth®, or wide area wireless communication, such as Wi-Fi®.

The server apparatus 10 is a server apparatus on a cloud, and manages, for example, transaction data on items sent from the sales data processing apparatus 30 via the portable terminal 20.

The portable terminal 20 is a portable terminal apparatus, such as a smartphone, and sends, to the server apparatus 10, for example, the transaction data on items sent from the sales data processing apparatus 30. The portable terminal 20 has various applications (e.g. a program application, an order entry application (i.e. a register application), a report application, etc.) installed therein to realize functions of predetermined modes (e.g. a program mode, a register mode, a report mode, etc.) of the sales data processing apparatus 30 by wireless communication with the sales data processing apparatus 30.

The sales data processing apparatus 30 is an ECR or the like set in a store, such as a privately-run store, a supermarket or an eating establishment, to register, by operator operations, the transaction data, such as monetary amounts of items and the number of items sold to or provided for customers. In a store, at least one sales data processing apparatus 30 is set. The server apparatus 10 can manage the transaction data of a plurality of stores in an integrated fashion.

[1-2. Configuration of Portable Terminal]

A configuration of the portable terminal 20 is described.

Figure 2:
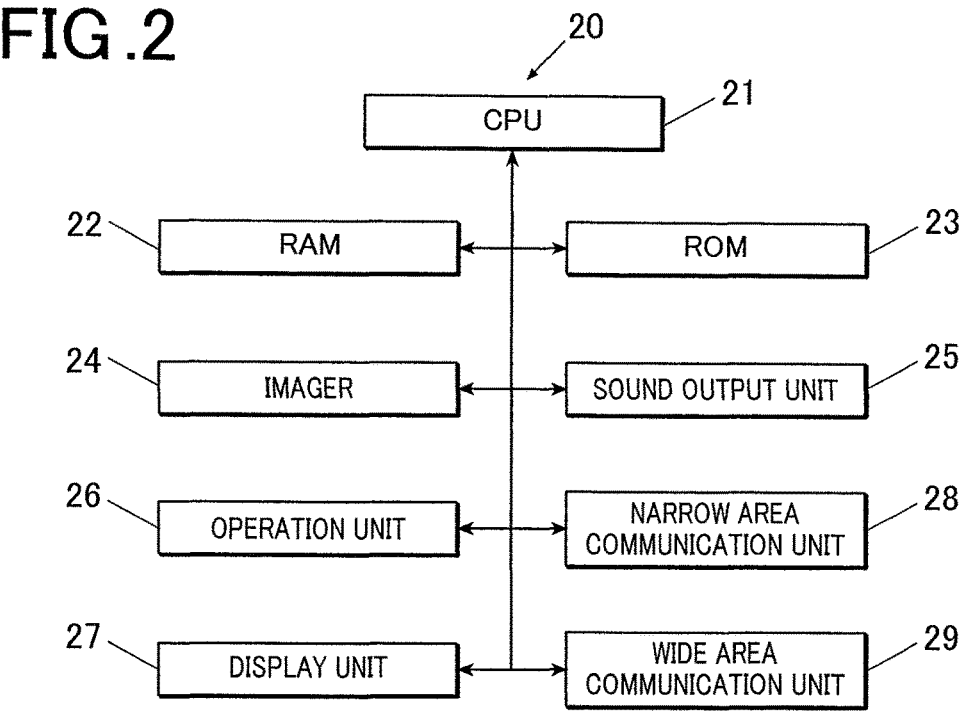
FIG. 2 is a block diagram showing a main-control configuration of a portable terminal.

As shown in FIG. 2, the portable terminal 20 includes a CPU 21, a RAM 22, a ROM 23, an imager 24, a sound output unit 25, an operation unit 26, a display unit 27, a narrow area communication unit 28 and a wide area communication unit 29.

The CPU 21 controls the components of the portable terminal 20. The CPU 21 reads a specified program(s) among various programs from the ROM 23, opens the read program(s) in the RAM 22, and performs a process(es) among various processes in cooperation with the opened program(s).

The RAM 22 is, for example, a volatile semiconductor memory, and forms a work area to store various data and programs.

The ROM 23 is a read only memory to store various data and various programs. The RAM 23 stores therein a system program(s), various application programs, such as the program application, the register application and the report application, that are executed by the CPU 21, a Web browser(s), data necessary for execution of these programs, and so forth.

The imager 24 images a subject in response to a user operations) and generates image data.

The sound output unit 25 includes a D/A convertor, an amplifier and a speaker, and converts sound data output from the RAM 22 or the ROM 23 into analog sound signals, thereby outputting sound.

The operation unit 26 includes: a key input unit including a home button; and a touchscreen integrated with the display unit 27, and accepts operation inputs from a user and outputs operation signals corresponding to the operation inputs to the CPU 21.

The display unit 27 includes a display, such as an LCD (Liquid Crystal Display) or an FPD (Flat Panel Display) using organic EL (Electro Luminescence) elements, and displays images based on display control signals output from the CPU 21 on its display screen.

The narrow area communication unit 28 includes an antenna, a demodulating circuit and a signal processing circuit, and performs narrow area wireless communication with the sales data processing apparatus 30 by a wireless communication system such as Bluetooth®.

The wide area communication unit 29 includes an antenna, a demodulating circuit and a signal processing circuit, and performs wide area wireless communication with the sales data processing apparatus 30 by a wireless communication system such as Wi-Fi®.

[1-3. Configuration of Sales Data Processing Apparatus]

A configuration of the sales data processing apparatus 30 is described.

Figure 3:
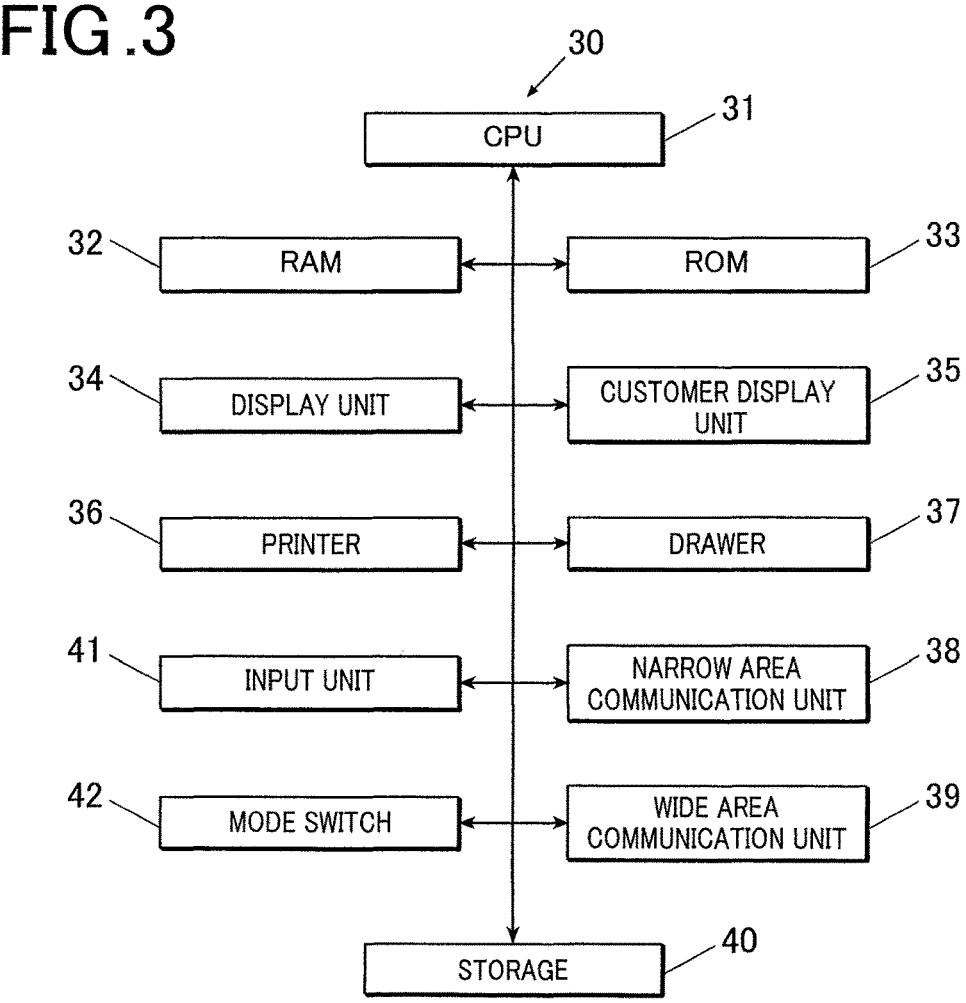
FIG. 3 is a block diagram showing a main-control configuration of a sales data processing apparatus.
Figure 4A:
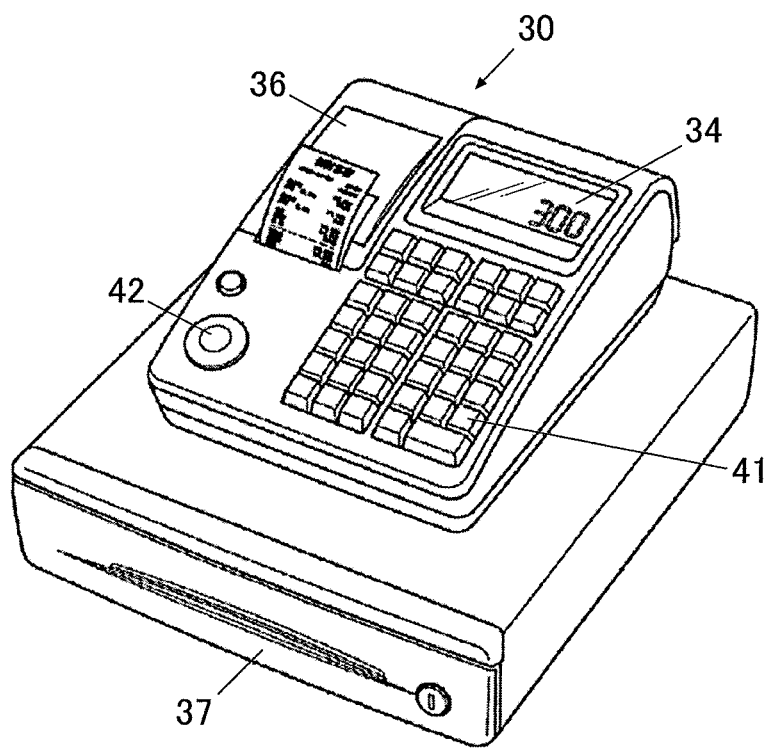
FIG. 4A and FIG. 4B are external views showing a schematic configuration of the sales data processing apparatus.
Figure 4B:
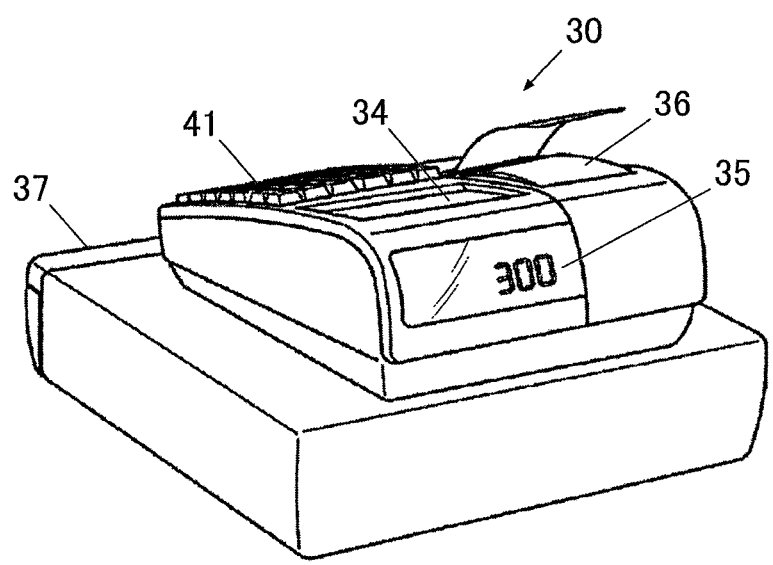

As shown in FIG. 3, FIG. 4A and FIG. 4B, the sales data processing apparatus 30 includes a CPU 31, a RAM 32, a ROM 33, a display unit 34, a customer display unit 35, a printer 36, a drawer 37, a narrow area communication unit 38, a wide area communication unit 39, a storage 40, an input unit 41 and a mode switch 42.

The CPU 31 controls the components of the sales data processing apparatus 30. The CPU 31 reads a specified program(s) among various programs from the ROM 33, opens the read program(s) in the RAM 32, and performs a process(es) among various processes in cooperation with the opened program(s).

The RAM 32 is, for example, a volatile semiconductor memory, and forms a work area to store various data and programs.

The ROM 33 is a read only memory to store various data and various programs.

As shown in FIG. 4A, the display unit 34 is a display device for an operator or an owner who operates the sales data processing apparatus 30 to see and check displayed contents (information on the monetary amounts of items, the total monetary amount, etc.). The display unit 34 includes a display, such as an LCD or an EL display, and displays images based on display control signals output from the CPU 31.

As shown in FIG. 4B, the customer display unit 35 is a display device for a customer who purchases an item(s) to see and check displayed contents (information on the monetary amounts of items, the total monetary amount, etc.). The customer display unit 35 includes a display, such as an LCD or an EL display, and displays images based on display control signals output from the CPU 31 on its display screen.

The printer 36 is a printer, such as a thermal printer, that prints data of receipts, electronic journals and so forth on paper, such as roll paper, under control of the CPU 31. The printer 36 has a mechanism to cut and then output roll paper after printing.

The drawer 37 is a drawer where cash, merchandise certificates (and/or checks), and so forth are stored. The drawer 37 is opened at the time of, for example, finishing registration of items (i.e. reporting) under control of the CPU 31.

The narrow area communication unit 38 includes an antenna, a demodulating circuit and a signal processing circuit, and performs narrow area wireless communication with the portable terminal 20 by a wireless communication system such as Bluetooth®.

The wide area communication unit 39 includes an antenna, a demodulating circuit and a signal processing circuit, and performs wide area wireless communication with the portable terminal 20 by a wireless communication system such as WiFi®.

The storage 40 is a storage in and from which information can be written and read, and includes a battery backup RAM, a flash memory and/or the like. The storage 40 stores therein the transaction data, information on various types of programming (i.e. setting), and so forth.

The input unit 41 has a keyboard including various function keys, and accepts operator inputs made by pressing the keys and outputs information on the operations to the CPU 31. Examples of the function keys include a numeric keypad, a multiplication key, a subtotal key, a refund key, a PLU (Price Look Up) key, and summing-up keys, such as a sold-by-check (and/or -certificate) key and a sold-by-charge (i.e. -credit) key.

The mode switch 42 is to switch the currently-selected mode of the sales data processing apparatus 30 to the program mode, a refund mode, an OFF mode, the register mode, a calculator mode, a read mode or the report mode.

The program mode is a mode to perform various types of programming (e.g. to program (i.e. set) unit prices of items) in the sales data processing apparatus 30. The refund mode is a mode to perform a refund process. The OFF mode is a mode to perform a process of turning off the sales data processing apparatus 30. The register mode is a mode to perform a register process of registering transaction data on purchased items. The calculator mode is a mode to perform calculation in the same manner as an ordinary calculator. The read mode is a mode to perform a read process of reading (i.e. checking) the registered transaction data. The report mode is a mode to perform a report process of reporting (and resetting) sales for one day after the store is closed on the day.

Among the modes of the sales data processing apparatus 30, the program mode, the register mode and the report mode are each a mode in which (power of) the communication unit (the narrow area communication unit 38 or the wide area communication unit 39) is turned on and wireless communication with the portable terminal 20 is performed. More specifically, the register mode is a mode in which the wide area communication unit 39 is turned on and wide area wireless communication with the portable terminal 20 is performed, and the program mode and the report mode are each a mode in which the narrow area communication unit 38 is turned on and narrow area wireless communication with the portable terminal 20 is performed. The reason why wide area wireless communication with the portable terminal 20 is performed in the register mode is that this makes it easy to take orders with the portable terminal 20 from customers who are away from the sales data processing apparatus 30. The reason why narrow area wireless communication with the portable terminal 20 is performed in the program mode is that this can avoid, if the register process in the register mode is being performed, using the same wireless (wide area wireless) to perform communication (e.g. to send/receive programming data). The reason why narrow area wireless communication with the portable terminal 20 is performed in the report mode is that the report process cannot be performed unless the drawer 37 is open.

The remaining modes, namely, the refund mode, the OFF mode, the calculator mode and the read mode, are each a mode in which (powers of) the communication units are turned off and no wireless communication with the portable terminal 20 is performed.

Figure 5:
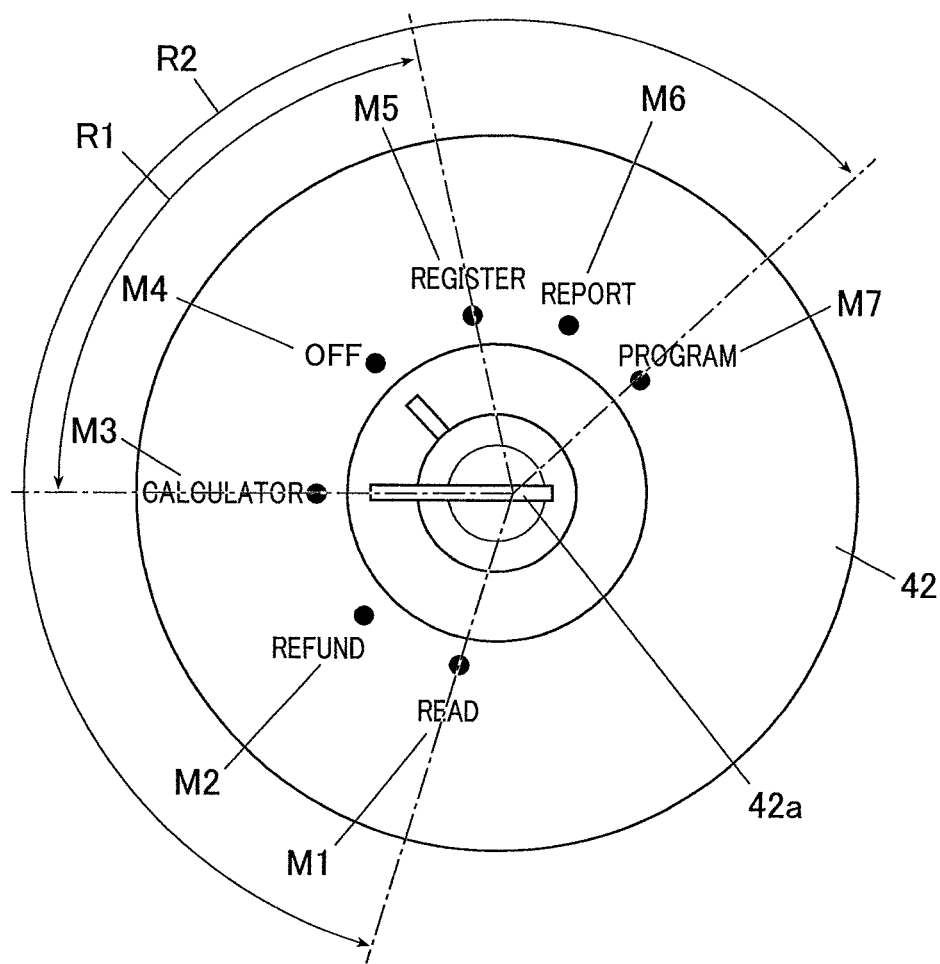
FIG. 5 is a plan view showing a configuration of a mode switch.
Figure 6A:
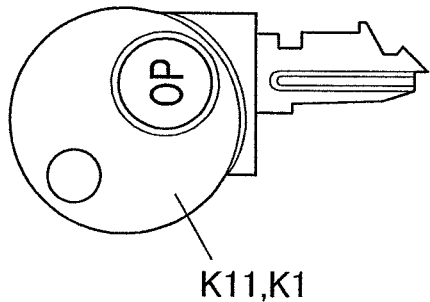
FIG. 6A and FIG. 6B show configurations of mode keys.
Figure 6B:
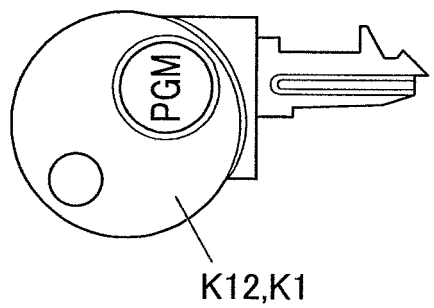

As shown in FIG. 5, the mode switch 42 has a key hole 42a into which a mode key K1 (FIG. 6A and FIG. 6B) can be inserted. Rotating/Turning the mode key K1 in the state in which the mode key K1 is inserted in the key hole 42a, thereby changing its indicating position, is an operation to select (and set) a mode corresponding to the position. That is, the mode switch 42 is configured such that the inserted mode key K1 is rotatable and a mode corresponding to the position to which the inserted mode key K1 has been rotated (hereinafter called "key-rotated position") is selected.

As the mode key K1, two types of keys, an operator key K11 (FIG. 6A) for the operator and an owner key K12 (FIG. 6B) for the owner, are used.

The mode switch 42 is configured such that a rotatable range of the mode key K1 varies according to the type of the inserted mode key K1. For example, the mode switch 42 is configured to limit the rotatable range of the key if the inserted key is the operator key K11 such that the rotatable range is narrower than that of the owner key K12.

More specifically, the operator key K11 can select any of the OFF mode, the register mode and the calculator mode among the modes of the sales data processing apparatus 30. That is, the operator can activate the OFF mode, the register mode and the calculator mode among the modes of the sales data processing apparatus 30.

Meanwhile, the owner key K12 can select any of all the modes of the sales data processing apparatus 30. That is, the owner can activate all the modes of the sales data processing apparatus 30.

In FIG. 5, "R1" represents the rotatable range of the operator key K11, and "R2" represents the rotatable range of the owner key K12. In the example shown in FIG. 5, the rotatable range R1 of the operator key K11 is set to be in the rotatable range R2 of the owner key K12.

As shown in FIG. 5, in the mode switch 42, the key-rotated positions to select the read mode M1, the refund mode M2, the calculator mode M3, the OFF mode M4, the register mode M5, the report mode M6 and the program mode M7, respectively, are arranged clockwise in this order.

Further, the mode switch 42 is configured such that the mode key K1 can be inserted at a position for the OFF mode M4 only, and cannot be taken out at any position except the position for the OFF mode M4, namely, at positions for the read mode M1, the refund mode M2, the calculator mode M3, the register mode M5, the report mode M6 and the program mode M7. This is applied to both the operator key K11 and the owner key K12.

Hereinafter, for the purpose of illustration, a "key-rotated position to select a mode" may be simply referred to as a "mode".

In this embodiment, the three modes (the calculator mode M3, the OFF mode M4 and the register mode M5) switchable/selectable by the operator key K11 are arranged to be adjacent to one another. Hence, a mode switching/selecting operation(s) by the operator key K11 can be performed without any trouble.

Further, in this embodiment, the key-rotated positions (first key-rotated positions) to select the modes in which the communication unit is turned on and wireless communication with the portable terminal 20 is performed (first modes: the register mode M5, the report mode M6 and the program mode M7), respectively, and the key-rotated positions (second key-rotated positions) to select the modes in which the communication units are turned off and no wireless communication with the portable terminal 20 is performed (second modes: the read mode M1, the refund mode M2, the calculator mode M3 and the OFF mode M4), respectively, are provided. The second key-rotated positions are set in such a way as not to be between the first key-rotated positions. Hence, for example, if switching from a "mode that turns on the communication unit" to another "mode that turns on the communication unit" is performed, because no "mode that turns off the communication units" is arranged therebetween, the mode switching/selecting operation can be performed without unnecessarily tuning on and off the communication unit(s).

Further, in this embodiment, key-rotated positions (third key-rotated positions) to select the modes in which the narrow area communication unit 38 is turned on and narrow area wireless communication with the portable terminal 20 is performed (third mode: the report mode M6 and the program mode M7), respectively, are arranged such that, between the key-rotated positions (third key-rotated positions), a key-rotated position(s) (a fourth key-rotated position(s)) to select the mode in which the wide area communication unit 39 is turned on and wide area wireless communication with the portable terminal 20 is performed (fourth mode(s): the register mode M5) is not interposed, and vice versa. Hence, for example, if switching from a "mode that turns on the narrow area communication unit 38" to another "mode that turns on the narrow area communication unit 38" is performed, because no "mode that turns on the wide area communication unit 39" is arranged therebetween, the mode switching/selecting operation can be performed without unnecessarily tuning on and off the wide are communication unit 39.

[2. Action]

Action in each mode of the sales data processing apparatus 30 is simply described with reference to FIG. 7. In FIG. 7, the operator key K11 can select any of the calculator mode M3, the OFF mode M4 and the register mode M5, and the owner key K12 can select any of all the modes (the read mode M1, the refund mode M2, the calculator mode M3, the OFF mode M4, the register mode M5, the report mode M6 and the program mode M7). By selecting a desired mode by the operator key K11 or the owner key K12, the mode is performed.

[2-1. Modes in Which Communication Units are Turned Off]

The read mode M1, the refund mode M2, the calculator mode M3 and the OFF mode M4 are each the mode in which the communication units (the narrow area communication unit 38 and the wide area communication unit 39) are turned off and no wireless communication with the portable terminal 20 is performed.

Hence, first, the CPU 31 performs a process of turning off the communication units (Step S11, S21, S31 or S41). If the communication units are already off, the CPU 31 does not do anything and proceeds to the next step.

Next, the CPU 31 performs a process corresponding to one of the above modes on the basis of operator or owner operation(s). In the case of the read mode M1, the CPU 31 performs the read process of reading the registered transaction data on the basis of an owner operation(s) (Step S12). In the case of the refund mode M2, the CPU 31 performs the refund process on the basis of an owner operation(s) (Step S22). In the case of the calculator mode M3, the CPU 31 performs the calculator process on the basis of an owner or operator operation(s) (Step S32). In the case of OFF mode M4, the CPU 31 performs the process of turning off the sales data processing apparatus 30 (Step S42).

In Steps S12, S22, S32 and S42, the communication units are off, and hence no beacon to allow establishment of communication with the turned-on communication unit is output.

[2-2. Modes in Which Communication Unit is Turned On]

The register mode M5, the report mode M6 and the program mode M7 are each the mode in which the communication unit is turned on and wireless communication with the portable terminal 20 is performed.

Hence, first, the CPU 31 performs a process of turning on either the narrow area communication unit 38 or the wide area communication unit 39. In the register mode M5, the CPU 31 performs a process of turning on the wide area communication unit 39 and also performs a process of turning off the narrow area communication unit 38 (Step S51). In each of the report mode M6 and the program mode M7, the CPU 31 performs a process of turning on the narrow area communication unit 38 and also performs a process of turning off the wide area communication unit 39 (Step S61 or S71).

In the register mode M5, if the wide area communication unit 39 is already on (and the narrow area communication unit 38 is already off), the CPU 31 does not do anything and proceeds to the next step. In each of the report mode M6 and the program mode M7, if the narrow area communication unit 38 is already on (and the wide area communication unit 39 is already off), the CPU 31 does not do anything and proceeds to the next step.

Next, the CPU 31 puts the sales data processing apparatus 30 in a communicable state with an application installed in the portable terminal 20 and outputs a beacon to allow establishment of communication with the turned-on communication unit.

In the case of the register mode M5, the CPU 31 puts the sales data processing apparatus 30 in the communicable state with the order entry application installed in the portable terminal 20 and outputs the beacon to allow establishment of communication with the wide area communication unit 39 turned on in Step S51 (Step S52). When receiving the beacon output in Step S52, the portable terminal 20 establishes communication between the wide area communication unit 29 and the wide area communication unit 39 of the sales data processing apparatus 30, which is the sender of the beacon.

In the case of the report mode M6, the CPU 31 puts the sales data processing apparatus 30 in the communicable state with the report application installed in the portable terminal and outputs the beacon to allow establishment of communication with the narrow area communication unit 38 turned on in Step S61 (Step S62). In the case of the program mode M7, the CPU 31 puts the sales data processing apparatus 30 in the communicable state with the program application installed in the portable terminal 20 and outputs the beacon to allow establishment of communication with the narrow area communication unit 38 turned on in Step S71 (Step S72). When receiving the beacon output in Step S62 or Step S72, the portable terminal 20 establishes communication between the narrow area communication unit 28 and the narrow area communication unit 38 of the sales data processing apparatus 30, which is the sender of the beacon.

Next, the CPU 31 performs a process corresponding to one of the above modes.

In the case of the register mode M5, the CPU 31 handles a request for the register process sent from the portable terminal 20 and the manual register process by the operator or the owner with the sales data processing apparatus 30 at the same time (Step S53). That is, if the request sent from the portable terminal 20 is received and the manual registration is performed at the same time, the CPU 31 handles both of them by multi-tasking. The request for the register process sent from the portable terminal 20 is order data sent from the portable terminal 20 to the sales data processing apparatus 30 when the order entry application is started in the portable terminal 20 and the register process is performed by the operator or the owner with the portable terminal 20.

In the case of the report mode M6, after handling the manual report process by the owner with the sales data processing apparatus 30, the CPU 31 sends the sales data to the report application installed in the portable terminal 20 (Step S63). The portable terminal 20 waits to receive the sales data.

In the case of the program mode M7, the CPU 31 handles either a request for the program process sent from the portable terminal 20 or the manual program process by the operator or the owner with the sales data processing apparatus 30 (Step S73). That is, if the request sent from the portable terminal 20 is received and the manual programming is performed at the same time, the CPU 31 handles, by single-tasking, one of them that the CPU 31 accepts earlier. The request for the program process sent from the portable terminal 20 is programming data sent from the portable terminal 20 to the sales data processing apparatus 30 when the program application is started in the portable terminal 20 and the program process is performed by the owner with the portable terminal 20.

[2-3. Report Mode]

Figure 8:
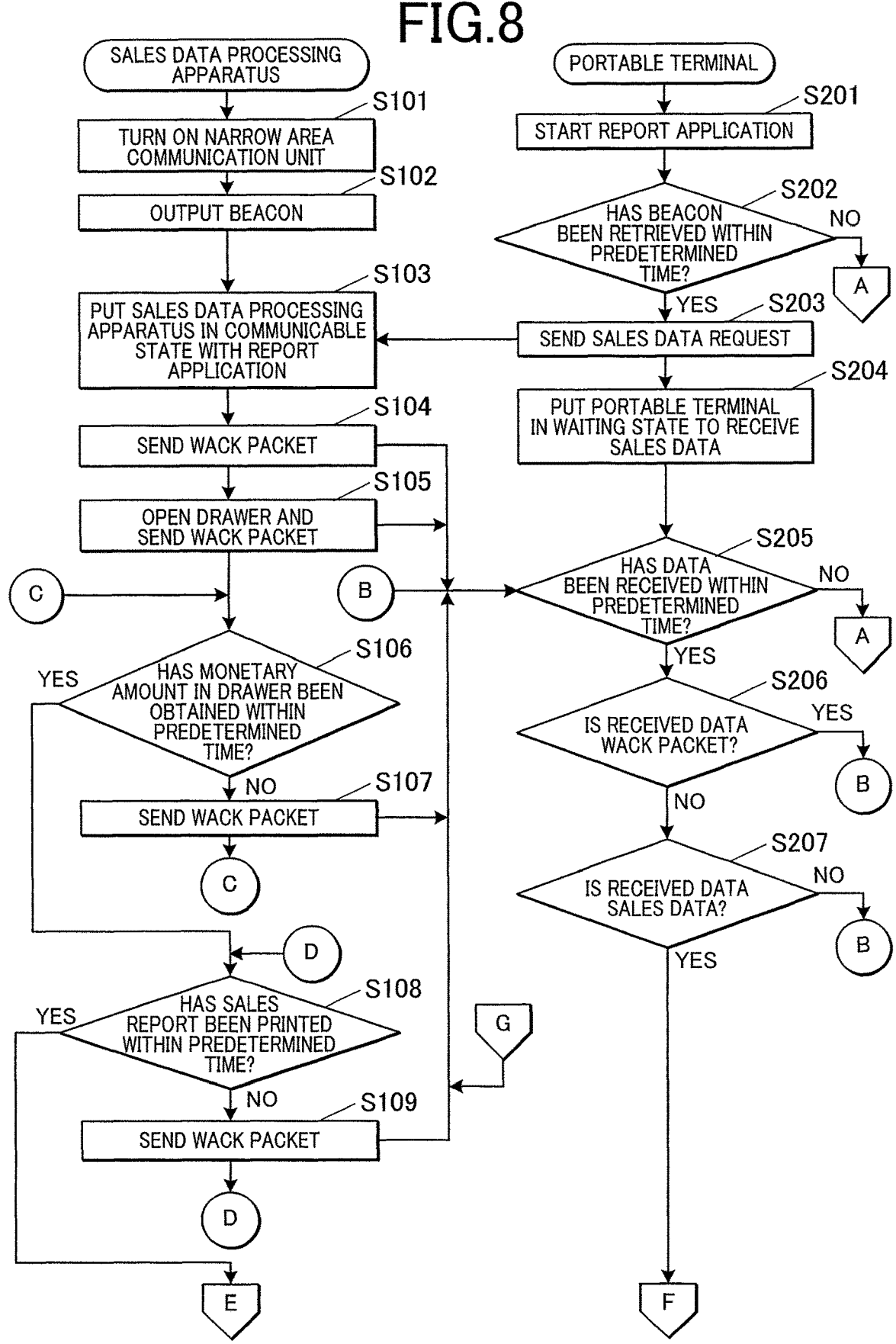
FIG. 8 is a flowchart showing action in a report mode.

Action in the report mode M6 in the sales data processing system 1 according to this embodiment is described in detail with reference to FIG. 8 and FIG. 9. The action is performed by the owner rotating the owner key K12 to select the report mode M6.

First, the CPU 31 of the sales data processing apparatus performs the process of turning on the narrow area communication unit 38 (Step S101). If the narrow area communication unit 38 is already on, the CPU 31 does not do anything and proceeds to the next step, namely, Step S102.

Meanwhile, the CPU 21 of the portable terminal 20 starts the report application on the basis of an owner operation (touch operation or the like) (Step S201). FIG. 10A shows an example of a start screen G1 displayed on the display unit 27 of the portable terminal 20 when the report application is started in Step S201. The start screen G1 is provided with a connection button B1 for communication connection with the sales data processing apparatus 30, a request button B2 to request the sales data processing apparatus 30 to send the sales data, and a menu button B3 to display a menu screen.

Next, the CPU 31 of the sales data processing apparatus 30 outputs the beacon to allow establishment of communication with the turned-on narrow area communication unit 38 (Step S102).

Meanwhile, the CPU 21 of the portable terminal 20 determines whether or not it has retrieved, within a predetermined time, the beacon output from the sales data processing apparatus 30 in Step S102 on the basis of an owner touch operation on the connection button B1 on the start screen G1 (Step S202). In Step S202, the predetermined time is, for example, ten seconds.

When determining that it has retrieved, within the predetermined time, the beacon output from the sales data processing apparatus 30 in Step S102 (Step S202; YES), the CPU 21 displays a screen (a communication connection screen G2) indicating that communication connection with the sales data processing apparatus 30 has been established on the display unit 27 (FIG. 10B), and then proceeds to Step S203. That is, the CPU 21 functions as a first display control section of the present invention.

On the other hand, when determining that it has not retrieved, within the predetermined time, the beacon output from the sales data processing apparatus 30 in Step S102 (Step S202; NO), the CPU 21 displays a communication error screen G3 on the display unit 27 (Step S213) as shown in FIG. 10C.

Next, the CPU 21 of the portable terminal 20 sends, to the sales data processing apparatus 30, a sales data request (a sending request) to request the sales data processing apparatus 30 to send the sales data on the basis of an owner touch operation on the request button B2 on the start screen G1 (Step S203). That is, the CPU 21 functions as a first sending control section of the present invention.

Next, the CPU 21 puts the portable terminal 20 in a waiting state to receive the sales data that is sent from the sales data processing apparatus 30 (Step S204). FIG. 10D shows an example of a screen (a waiting-to-receive screen) G4 displayed on the display unit 27 of the portable terminal 20 when the portable terminal 20 is put in the waiting state to receive the sales data in Step S204.

When receiving the sales data request sent from the portable terminal 20 in Step S203, the CPU 31 puts the sales data processing apparatus 30 in the communicable state with the report application installed in the portable terminal 20 (Step S103).

Next, the CPU 31 of the sales data processing apparatus 30 sends a WACK packet to the portable terminal 20 so that the portable terminal 20 stays in the waiting state to receive the sales data (Step S104).

Next, the CPU 31 of the sales data processing apparatus 30 opens the drawer 37 and sends a WACK packet to the portable terminal 20 (Step S105).

Next, the CPU 31 of the sales data processing apparatus determines whether or not it has obtained, within a predetermined time, a monetary amount in the drawer 37 input by an owner operation (Step S106). In Step S106, the predetermined time is, for example, five seconds.

When determining that it has obtained, within the predetermined time, the monetary amount in the drawer 37 input by the owner operation (Step S106; YES), the CPU 31 proceeds to Step S108.

On the other hand, when determining that it has not obtained, within the predetermined time, the monetary amount in the drawer 37 input by the owner operation (Step S106; NO), the CPU 31 sends a WACK packet to the portable terminal 20 (Step S107) and returns to Step S106.

Figure 11:
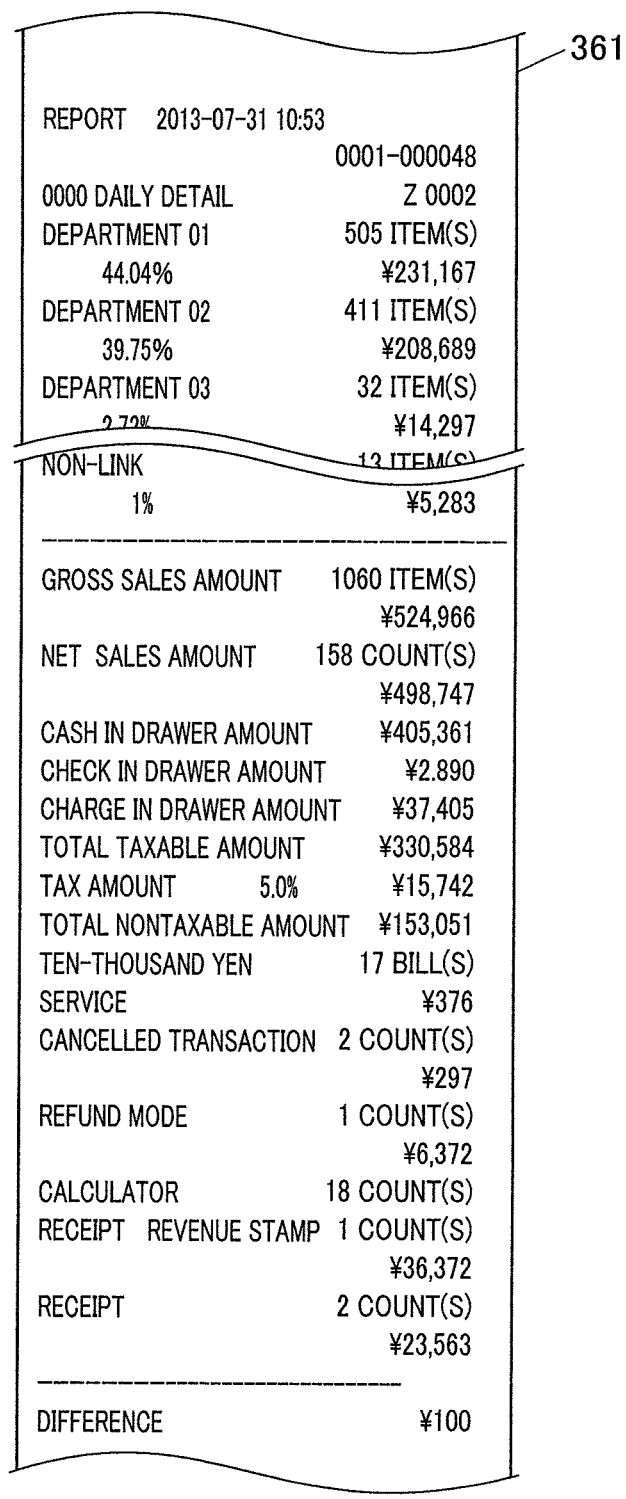
FIG. 11 shows an example of a printed sales report.

Next, the CPU 31 of the sales data processing apparatus 30 determines whether or not the printer 36 has printed a sales report on a receipt sheet within a predetermined time on the basis of the sales data obtained by aggregating predetermined transaction data (the transaction data on the day) registered in the register mode M5 (Step S108). In Step S108, the predetermined time is, for example, five seconds. Here, the CPU 31 causes the printer 36 to print a difference between a monetary amount in the drawer 37 calculated from the transaction data or the like and the actual monetary amount in the drawer 37 obtained in Step S106. FIG. 11 shows an example of a printed sales report 361. In the example shown in FIG. 11, date and time, the number of sold items and a sales amount at each department, a gross sales amount, a net sales amount, a cash in drawer amount, the difference between the calculated monetary amount in the drawer 37 and the actual monetary amount in the drawer 37, and so forth are printed.

When determining that the printer 36 has printed the sales report within the predetermined time (Step S108; YES), the CPU 31 proceeds to Step S110.

On the other hand, when determining that the printer 36 has not printed the sales report within the predetermined time (Step S108; NO), the CPU 31 sends a WACK packet to the portable terminal 20 (Step S109) and returns to Step S108.

Next, the CPU 31 of the sales data processing apparatus 30 sends the sales data to the portable terminal 20 (Step S110). That is, the CPU 31 functions as a sending control section of the present invention.

In Step S205, the CPU 21 of the portable terminal 20 determines whether or not the portable terminal 20 has received data within a predetermined time after Step S204. In Step S205, the predetermined time is, for example, ten seconds.

When determining that the portable terminal 20 has received data within the predetermined time (Step S205; YES), the CPU 21 proceeds to Step S206.

On the other hand, when determining that the portable terminal 20 has not received data within the predetermined time (Step S205; NO), the CPU 21 determines that an error of some kind has occurred in the sales data processing apparatus 30 and displays the communication error screen G3 (FIG. 10C) on the display unit 27 (Step S213).

Next, the CPU 21 of the portable terminal 20 determines whether or not the data received in Step S205 is a WACK packet(s) (the WACK packet(s) sent in any of Steps S104, S105, S107 and S109) (Step S206).

When determining that the data received in Step S205 is a WACK packet(s) (Step S206; YES), the CPU 21 returns to Step S205.

On the other hand, when determining that the data received in Step S205 is not a WACK packet(s) (Step S206; YES), the CPU 21 proceeds to Step S207.

Next, the CPU 21 of the portable terminal 20 determines whether or not the data received in Step S205 is the sales data (the sales data sent in Step S110) (Step S207).

When determining that the data received in Step S205 is the sales data (Step S207; YES), the CPU 21 proceeds to Step S208.

On the other hand, when determining that the data received in Step S205 is not the sales data (Step S207; NO), the CPU 21 returns to Step S205.

In Step S208, the CPU 21 of the portable terminal 20 saves, in the RAM 22 or the ROM 23, the sales data sent from the sales data processing apparatus 30 in Step S110. That is, the CPU 21 functions as a storage control section of the present invention.

Next, the CPU 21 of the portable terminal 20 sends, to the sales data processing apparatus 30, a reception-completed notification indicating that reception of the sales data has been completed and a transaction data deletion request to request the sales data processing apparatus 30 to delete the transaction data (Step S209). That is, the CPU 21 functions as a second sending control section of the present invention.

Next, the CPU 21 puts the portable terminal 20 in the waiting state to receive an ACK packet (acknowledgement) that is sent from the sales data processing apparatus 30 (Step S210).

The CPU 31 of the sales data processing apparatus 30 determines whether or not the sales data processing apparatus has received, within a predetermined time, the reception-completed notification sent (as a response) from the portable terminal 20 in Step S209 (Step S111). In Step S111, the predetermined time is a period of time that is normally enough to receive the reception-completed notification.

When determining that the sales data processing apparatus 30 has received the reception-completed notification within the predetermined time (Step S111; YES), the CPU 31 proceeds to Step S112.

On the other hand, when determining that the sales data processing apparatus 30 has not received the reception-completed notification within the predetermined time (Step S111; NO), the CPU 31 proceeds to Step S114.

The CPU 31 of the sales data processing apparatus 30 causes the printer 36 to print, on the receipt sheet, a communication result based on the reception-completed notification sent (as a response) from the portable terminal 20 in Step S209 (i.e. sending result information indicating that the sales data has been sent) (Step S112). That is, the CPU 31 functions as a printing control section of the present invention. FIG. 12A shows an example of the sales report 361 with the communication result printed. In the example shown in FIG. 12A, a message of normal sending ("succeeded in sending"), the portable terminal ("○△△xx○") as a destination, and sent date and time ("2017/7/31, 10:54") are printed.

Next, the CPU 31 of the sales data processing apparatus 30 deletes the transaction data on the day (sales data) on the basis of the transaction data deletion request sent (as a response) from the portable terminal 20 in Step S209 and sends an ACK packet to the portable terminal 20 (Step S113). That is, the CPU 31 functions as a deletion section of the present invention.

The CPU 21 of the portable terminal 20 determines whether or not the portable terminal 20 has received the ACK packet within a predetermined time after Step S210 (Step S211). In Step S211, the predetermined time is, for example, ten seconds.

When determining that the portable terminal 20 has received the ACK packet within the predetermined time (Step S211; YES), the CPU 21 proceeds to the next step, namely, Step S212.

On the other hand, when determining that the portable terminal 20 has not received the ACK packet within the predetermined time (Step S211; NO), the CPU 21 determines that an error of some kind has occurred in the sales data processing apparatus 30 and displays the communication error screen G3 (FIG. 10C) on the display unit 27 (Step S213).

In Step S114, the CPU 31 of the sales data processing apparatus 30 causes the printer 36 to print, on the receipt sheet, a communication error indicating that the sales data processing apparatus 30 has not received the reception-completed notification sent (as a response) from the portable terminal 20 in Step S209 (i.e. sending result information indicating that the sales data has not been sent). FIG. 12B shows an example of the sales report 361 with the communication error printed. In the example shown in FIG. 12B, a message of failed sending ("failed to send"), the portable terminal 20 ("○△△xx○") as a destination, and sent date and time ("20177/31, 10:54") are printed.

Next, the CPU 31 of the sales data processing apparatus 30 ends the report process (Step S115).

Meanwhile, the CPU 21 of the portable terminal 20 ends the communication (narrow area communication) with the sales data processing apparatus 30 and displays, on the display unit 27, a data display screen G5 (FIG. 10E) to display the transaction data on the day on the basis of the sales data sent from the sales data processing apparatus 30 in Step S110 (Step S212). That is, the CPU 21 functions as a second display control section of the present invention.

On the data display screen G5, the transaction data D1 on the day is displayed. In the example shown in FIG. 10E, the transaction data D1 on the day is displayed in the form of image data, but not limited thereto. The transaction data D1 on the day may be displayed in the form of text data. Further, the data display screen G5 is provided with a closing button B4 to close the data display screen G5 and a sending button B5 to send the transaction data on the day to a cloud (the server apparatus 10). The CPU 21 thereafter sends the sales data to the server apparatus 10 as needed (i.e. when, on the data display screen G5, a touch operation on the sending button B5 is performed), and then ends the report application. That is, the CPU 21 functions as a third sending control section of the present invention.

The sales data may be sent to the server apparatus 10 in the form of CSV data or PDF data. Further, as another method for sending the sales data to the server apparatus 10, the sales data may be sent by email. In this case, in which the method of sending the sales data by email is employed, too, the sales data may be sent in the form of CSV data or PDF data.

[3. Advantageous Effects]

As described above, the sales data processing apparatus 30 of the sales data processing system 1 of this embodiment performs control to send, to a predetermined terminal apparatus (portable terminal 20), sales data obtained by aggregating predetermined transaction data; and performs control to print, together with the sales data, sending result information indicating whether or not the sales data has been sent.

Hence, the sales data processing apparatus 30 of this embodiment can send data to the portable terminal 20 by wireless communication without using a storage medium, such as an SD card, and accordingly can readily send the sales data to the portable terminal 20. Further, the sales data processing apparatus 30 of this embodiment can print a note indicating whether or not data sending to the portable terminal 20 has been performed normally, and hence can defer deletion of the sales data until the data sending to the portable terminal 20 is performed normally and accordingly can send the sales data to the portable terminal 20 for sure.

Further, the sales data processing apparatus 30 of this embodiment performs the control to print the sending result information after the sales data processing apparatus 30 receives a reception-completed notification sent from the terminal apparatus, the reception-completed notification indicating that reception of the sales data has been completed, or if the sales data processing apparatus 30 does not receive the reception-completed notification within a predetermined time.

Thus, the sales data processing apparatus 30 of this embodiment prints the sending result information no matter if the data sending to the portable terminal 20 has been performed normally or not, and hence can defer deletion of the sales data until the data sending to the portable terminal 20 is performed normally and accordingly can send the sales data to the portable terminal 20 for sure.

Further, the sales data processing apparatus 30 of this embodiment deletes, when the sales data has been sent to the terminal apparatus, the sales data after the sales data processing apparatus 30 receives the reception-completed notification sent from the terminal apparatus.

Hence, the sales data processing apparatus 30 of this embodiment can defer deletion of the sales data until the data sending to the portable terminal 20 is performed normally and accordingly can send the sales data to the portable terminal 20 for sure.

Further, the sales data processing apparatus 30 of this embodiment performs the control to print the sending result information such that the sending result information is printed after the sales data is printed.

Hence, the sales data processing apparatus 30 of this embodiment can prevent the sales data and the sending result information from being printed in a mixed-up manner and accordingly can prevent errors in the report process from being caused.

Further, the sales data processing apparatus 30 of this embodiment performs the control to print the sales data and the sending result information on a receipt sheet.

Hence, the sales data processing apparatus 30 of this embodiment can perform the process with the printer 36, which the sales data processing apparatus 30 has, and accordingly can perform the process without being provided with an additional component. This can prevent increase in cost and size of the apparatus.

Further, the sales data processing apparatus 30 of this embodiment performs the control to send the sales data to the terminal apparatus by wireless communication in response to a predetermined sending request sent from the terminal apparatus by the wireless communication.

Hence, the sales data processing apparatus 30 of this embodiment can send data to the portable terminal 20 by wireless communication without using a storage medium, such as an SD card, and accordingly can readily send the sales data to the portable terminal 20. Further, the sales data processing apparatus 30 of this embodiment can send the sales data to the portable terminal 20 that is ready to receive the sales data and accordingly can send the sales data to the portable terminal 20 for sure.

In the above, the present invention is described on the basis of an embodiment in detail. However, the present invention is not limited to the above embodiment and can be modified without departing from the scope of the present invention.

For example, in the above embodiment, after printing the communication result in Step S112 in FIG. 9, the sales data processing apparatus 30 proceeds to Step S113 without informing the portable terminal 20 about printing of the communication result. This is not intended to limit the present invention. That is, after printing the communication result in Step S112, the sales data processing apparatus 30 may send, to the portable terminal 20, a printing-done announcement to inform the portable terminal 20 about printing of the communication result. At the time, the portable terminal 20 may display contents of the communication result printed in Step S112 on the display unit 27.

Further, the sales data processing apparatus 30 and the portable terminal 20 may store the contents of the communication result printed in Step S112 in their storages (the storage 40, the RAM 22, the ROM 23, etc.) as log information.

Further, in the above embodiment, after printing the communication error in Step S114 in FIG. 9, the sales data processing apparatus 30 proceeds to Step S115. This is not intended to limit the present invention. For example, after printing the communication error in Step S114 in FIG. 9, the sales data processing apparatus 30 may proceed to Step S110 and send the sales data to the portable terminal 20 again.

Further, in the above embodiment, in the mode switch 42, the read mode M1, the refund mode M2, the calculator mode M3, the OFF mode M4, the register mode M5, the report mode M6 and the program mode M7 are arranged in this order. This is not intended to limit the present invention. For example, the read mode M1, the refund mode M2, the calculator mode M3 and the OFF mode M4, in which no wireless communication with the portable terminal 20 is performed, can be arranged in a random order, namely, in any order. Similarly, the report mode M6 and the program mode M7, in which wireless communication performed with the portable terminal 20 is the same (narrow area wireless communication), can be arranged in a random order, namely, in any order, and hence the program mode M7 and the report mode M6 may be arranged clockwise in this order.

Further, for example, the register mode M5, in which the wide area communication unit 39 is turned on and wide area wireless communication with the portable terminal 20 is performed, may be arranged, in the clockwise direction, behind the report mode M6 and the program mode M7, in which the narrow area communication unit 38 is turned on and narrow area wireless communication with the portable terminal 20 is performed.

Further, in the above embodiment, there are three modes (the resister mode M5, the report mode M6 and the program mode M7) each as the first mode, which causes the communication unit to be communicable with the portable terminal 20, and four modes (the read mode M1, the refund mode M2, the calculator mode M3 and the OFF mode M4) each as the second mode, which causes the communication units to be uncommunicable with the portable terminal 20. This is not intended to limit the present invention. As far as the mode switch 42 has two or more modes as the first mode and at least one mode as the second mode, the mode switch 42 can have any configuration.

Further, in the above, between the portable terminal 20 and the sales data processing apparatus 30, two types of wireless communication, namely, narrow area wireless communication and wide area wireless communication, can be performed. This is not intended to limit the present invention. That is, even if only one of the two types of wireless communication can be performed, the present invention is applicable.

Further, in the above embodiment, the operator key K11 can switch (i.e. select any of) the calculator mode M3, the OFF mode M4 and the register mode M5. This is not intended to limit the present invention. For example, the operator key K11 may further be able to select the read mode M1. In this case, it is preferable that the read mode M1 be arranged at a position to be adjacent to the calculator mode M3, the OFF mode M4 and/or the register mode M5.

Further, the operator key K11 may not be provided (i.e. only the owner key K12 is provided). In this case, the mode switch 42 does not need to be configured such that the rotatable range varies according to the type of the mode key K1, and accordingly can be manufactured readily.

Figure 13:
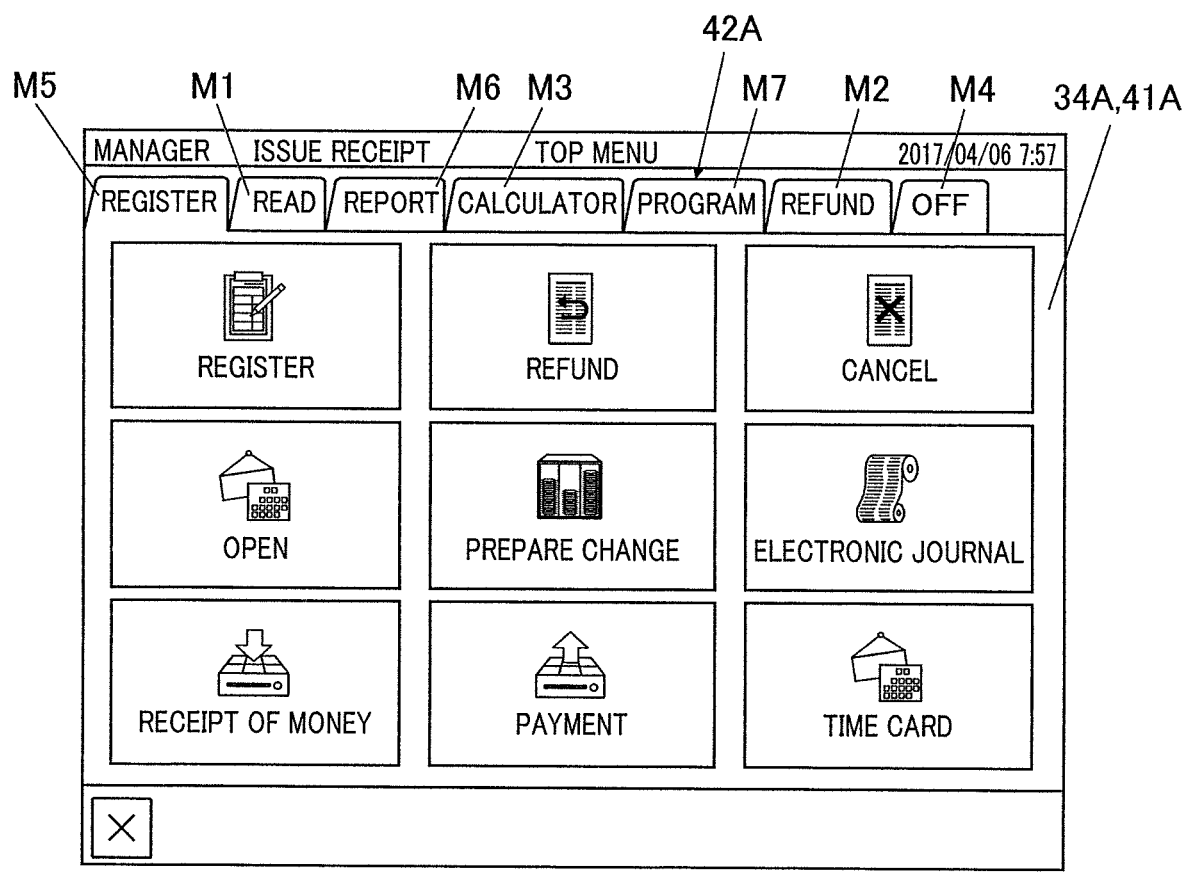
FIG. 13 shows a modification of the configuration of the sales data processing apparatus.

In the above embodiment, as shown in FIG. 4A, FIG. 4B and so forth, the display unit 34, the input unit 41 and the mode switch 42 are provided as individual components. This is not intended to limit the present invention. For example, as shown in FIG. 13, an input unit 41A may be integrated with a display unit 34A, thereby being configured as a touchscreen, and on the display unit 34A, a mode switcher 42A may be displayed instead of the mode switch 42. The mode switcher 42A can switch (i.e. select any of) the modes (the read mode M1, the refund mode M2, the calculator mode M3, the OFF mode M4, the register mode M5, the report mode M6 and the program mode M7) by a tab system. Thus, the display unit 34A, the input unit 41A and the mode switcher 42A can be configured as a single component. This configuration enables mode switching/selecting by a simpler operation(s).

In the above, as a computer readable medium storing the programs to perform the processes of the present invention, a hard disk, a nonvolatile memory or the like is used. The computer readable medium is not limited thereto, and may be a portable recording/storage medium, such as a CD-ROM. Further, as a medium to provide data of the programs via a communication line, a carrier wave can be used.

Although several embodiments of the present invention are described in the above, the scope of the present invention is not limited thereto, and includes the scope of claims below and the scope of their equivalents.

What is claimed is:

1. A sales data processing apparatus comprising:
a memory in which transaction data is registered;
a mode switch that is operable by a user to select among a plurality of operation modes, the plurality of operation modes including a report mode;
a processor which starts a control process in response to (i) the report mode being selected by the mode switch and (ii) receipt of a request signal sent wirelessly from a portable terminal apparatus;
a narrow area wireless communication unit; and
a wide area wireless communication unit, having a wireless communication area that is wider than the narrow area wireless communication unit,
wherein the control process includes:
a first output process comprising (i) wirelessly sending, to the portable terminal apparatus, sales data obtained by aggregating the transaction data registered in the memory, and (ii) printing the sales data on a receipt sheet with a printer; and
a second output process comprising printing, on the receipt sheet on which the sales data has been printed by the first output process, sending result information indicating whether the wireless sending of the sales data to the portable terminal apparatus has succeeded or failed, such that the sales data and the sending result information are present on the same receipt sheet,
wherein the plurality of modes selectable by the mode switch include:
a plurality of first modes, in which the sales data processing apparatus turns on one of the narrow area wireless communication unit and the wide area wireless communication unit, and turns off the other of the narrow area wireless communication unit and the wide area wireless communication unit; and
a plurality of second modes, in which the sales data processing apparatus turns off both the narrow area wireless communication unit and the wide area wireless communication unit, and
wherein the report mode is one of the first modes.

2. The sales data processing apparatus according to claim 1, wherein the second output process includes:
printing, as the sending result information, information indicating that the wireless sending of the sales data to the portable terminal apparatus has succeeded, if the sales data processing apparatus has received, by wireless communication, a reception-completed notification sent from the portable terminal apparatus, the reception-completed notification indicating that reception of the sales data has been completed, and
printing, as the sending result information, information indicating that the wireless sending of the sales data to the portable terminal apparatus has failed, if the sales data processing apparatus has not received the reception-completed notification.

3. The sales data processing apparatus according to claim 2, wherein the control process performed by the processor further includes:
deleting, from the memory, the transaction data registered in the memory, after the reception-completed notification is received.

4. The sales data processing apparatus according to claim 1, wherein the first output process includes starting wirelessly sending the sales data to the portable terminal apparatus after completing printing the sales data on the receipt sheet.

5. A sales data processing apparatus comprising:
a memory in which transaction data is registered;
a mode switch that is operable by a user to select among a plurality of operation modes, the plurality of operation modes including a report mode;
a processor which starts a control process in response to (i) the report mode being selected by the mode switch and (ii) receipt of a request signal sent wirelessly from a portable terminal apparatus;
a narrow area wireless communication unit; and
a wide area wireless communication unit, having a wireless communication area that is wider than the narrow area wireless communication unit,
wherein the control process includes:
a first output process comprising (i) wirelessly sending, to the portable terminal apparatus, sales data obtained by aggregating the transaction data registered in the memory, and (ii) printing the sales data on a receipt sheet with a printer; and
a second output process comprising printing, on the receipt sheet on which the sales data has been printed by the first output process, sending result information indicating whether the wireless sending of the sales data to the portable terminal apparatus has succeeded or failed, such that the sales data and the sending result information are present on the same receipt sheet, and
wherein the plurality of modes selectable by the mode switch include:
the report mode, wherein in the report mode, the sales data processing apparatus turns on the narrow area wireless communication unit and turns off the wide area wireless communication unit;
a first mode, in which the sales data processing apparatus turns on the wide area wireless communication unit and turns off the narrow area wireless communication unit; and
a second mode, in which the sales data processing apparatus turns off both the narrow area wireless communication unit and the wide area wireless communication unit.

6. The sales data processing apparatus according to claim 5, wherein the second output process includes:
printing, as the sending result information, information indicating that the wireless sending of the sales data to the portable terminal apparatus has succeeded, if the sales data processing apparatus has received, by wireless communication, a reception-completed notification sent from the portable terminal apparatus, the reception-completed notification indicating that reception of the sales data has been completed, and
printing, as the sending result information, information indicating that the wireless sending of the sales data to the portable terminal apparatus has failed, if the sales data processing apparatus has not received the reception-completed notification.

7. The sales data processing apparatus according to claim 6, wherein the control process performed by the processor further includes:
deleting, from the memory, the transaction data registered in the memory, after the reception-completed notification is received.

8. The sales data processing apparatus according to claim 5, wherein the first output process includes starting wirelessly sending the sales data to the portable terminal apparatus after completing printing the sales data on the receipt sheet.

9. An information processing system comprising:
a portable terminal apparatus; and
a sales data processing apparatus including:
a memory in which transaction data is registered;
a mode switch that is operable by a user to select among a plurality of operation modes, the plurality of operation modes including a report mode; and
a first processor which starts a first control process, in response to (i) the report mode being selected by the mode switch and (ii) receipt of a request signal sent wirelessly from the portable terminal apparatus, the request signal being sent in response to a user operation on the portable terminal apparatus,
wherein the first control process includes:
a first output process comprising (i) wirelessly sending, to the portable terminal apparatus, sales data obtained by aggregating the transaction data registered in the memory, and (ii) printing the sales data on a receipt sheet with a printer; and
a second output process comprising printing, on the receipt sheet on which the sales data has been printed by the first output process, sending result information indicating whether the wireless sending of the sales data to the portable terminal apparatus has succeeded or failed, such that the sales data and the sending result information are present on the same receipt sheet,
wherein the portable terminal apparatus includes:
a first wireless communication unit; and
a second wireless communication unit, having a wireless communication area that is wider than the first wireless communication unit, and
wherein the portable terminal apparatus receives the sales data from the sales data processing apparatus via the first wireless communication unit and sends the received sales data to a server via the second wireless communication unit.

10. The information processing system according to claim 9, wherein the second output process includes:
printing, as the sending result information, information indicating that the wireless sending of the sales data to the portable terminal apparatus has succeeded, if the sales data processing apparatus has received, by wireless communication, a reception-completed notification sent from the portable terminal apparatus, the reception-completed notification indicating that reception of the sales data has been completed, and
printing, as the sending result information, information indicating that the wireless sending of the sales data to the portable terminal apparatus has failed, if the sales data processing apparatus has not received the reception-completed notification.

11. The information processing system according to claim 10, wherein the portable terminal apparatus includes a second processor which performs a second control process including:
sending the reception-completed notification to the sales data processing apparatus when reception of the sales data sent from the sales data processing apparatus by the first output process has been completed.

12. The information processing system according to claim 9, wherein the first output process includes starting wirelessly sending the sales data to the portable terminal apparatus after completing printing the sales data on the receipt sheet.

13. An information processing system comprising:
a portable terminal apparatus; and
a sales data processing apparatus including:
a memory in which transaction data is registered;
a mode switch that is operable by a user to select among a plurality of operation modes, the plurality of operation modes including a report mode;
a first processor which starts a first control process, in response to (i) the report mode being selected by the mode switch and (ii) receipt of a request signal sent wirelessly from the portable terminal apparatus, the request signal being sent in response to a user operation on the portable terminal apparatus;
a narrow area wireless communication unit; and
a wide area wireless communication unit, having a wireless communication area that is wider than the narrow area wireless communication unit,
wherein the first control process includes:
a first output process comprising (i) wirelessly sending, to the portable terminal apparatus, sales data obtained by aggregating the transaction data registered in the memory, and (ii) printing the sales data on a receipt sheet with a printer; and
a second output process comprising printing, on the receipt sheet on which the sales data has been printed by the first output process, sending result information indicating whether the wireless sending of the sales data to the portable terminal apparatus has succeeded or failed, such that the sales data and the sending result information are present on the same receipt sheet,
wherein the plurality of modes selectable by the mode switch include:
a plurality of first modes, in which the sales data processing apparatus turns on one of the narrow area wireless communication unit and the wide area wireless communication unit, and turns off the other of the narrow area wireless communication unit and the wide area wireless communication unit; and
a plurality of second modes, in which the sales data processing apparatus turns off both the narrow area wireless communication unit and the wide area wireless communication unit, and
wherein the report mode is one of the first modes.

14. The information processing system according to claim 13, wherein the second output process includes:
printing, as the sending result information, information indicating that the wireless sending of the sales data to the portable terminal apparatus has succeeded, if the sales data processing apparatus has received, by wireless communication, a reception-completed notification sent from the portable terminal apparatus, the reception-completed notification indicating that reception of the sales data has been completed, and
printing, as the sending result information, information indicating that the wireless sending of the sales data to the portable terminal apparatus has failed, if the sales data processing apparatus has not received the reception-completed notification.

15. The information processing system according to claim 14, wherein the portable terminal apparatus includes a second processor which performs a second control process including:
sending the reception-completed notification to the sales data processing apparatus when reception of the sales data sent from the sales data processing apparatus by the first output process has been completed.

16. The information processing system according to claim 13, wherein the first output process includes starting wirelessly sending the sales data to the portable terminal apparatus after completing printing the sales data on the receipt sheet.

17. An information processing system comprising:
a portable terminal apparatus; and
a sales data processing apparatus including:
a memory in which transaction data is registered;
a mode switch that is operable by a user to select among a plurality of operation modes, the plurality of operation modes including a report mode;
a first processor which starts a first control process, in response to (i) the report mode being selected by the mode switch and (ii) receipt of a request signal sent wirelessly from the portable terminal apparatus, the request signal being sent in response to a user operation on the portable terminal apparatus;
a narrow area wireless communication unit; and
a wide area wireless communication unit, having a wireless communication area that is wider than the narrow area wireless communication unit,
wherein the first control process includes:
a first output process comprising (i) wirelessly sending, to the portable terminal apparatus, sales data obtained by aggregating the transaction data registered in the memory, and (ii) printing the sales data on a receipt sheet with a printer; and
a second output process comprising printing, on the receipt sheet on which the sales data has been printed by the first output process, sending result information indicating whether the wireless sending of the sales data to the portable terminal apparatus has succeeded or failed, such that the sales data and the sending result information are present on the same receipt sheet, and
wherein the plurality of modes selectable by the mode switch include:
the report mode, wherein in the report mode, the sales data processing apparatus turns on the narrow area wireless communication unit and turns off the wide area wireless communication unit;
a first mode, in which the sales data processing apparatus turns on the wide area wireless communication unit and turns off the narrow area wireless communication unit; and
a second mode, in which the sales data processing apparatus turns off both the narrow area wireless communication unit and the wide area wireless communication unit.

18. The information processing system according to claim 17, wherein the second output process includes:
printing, as the sending result information, information indicating that the wireless sending of the sales data to the portable terminal apparatus has succeeded, if the sales data processing apparatus has received, by wireless communication, a reception-completed notification sent from the portable terminal apparatus, the reception-completed notification indicating that reception of the sales data has been completed, and
printing, as the sending result information, information indicating that the wireless sending of the sales data to the portable terminal apparatus has failed, if the sales data processing apparatus has not received the reception-completed notification.

19. The information processing system according to claim 18, wherein the portable terminal apparatus includes a second processor which performs a second control process including:
sending the reception-completed notification to the sales data processing apparatus when reception of the sales data sent from the sales data processing apparatus by the first output process has been completed.

20. The information processing system according to claim 17, wherein the first output process includes starting wirelessly sending the sales data to the portable terminal apparatus after completing printing the sales data on the receipt sheet.

* * * * *